United States Patent
Riess et al.

(10) Patent No.: US 12,388,308 B2
(45) Date of Patent: Aug. 12, 2025

(54) ROTOR OF AN ELECTRIC ROTATING MACHINE, AND ELECTRIC ROTATING MACHINE

(71) Applicant: Schaeffler Technologies AG & Co. KG, Herzogenaurach (DE)

(72) Inventors: Stefan Riess, Kaufering (DE); Michael Menhart, Igling (DE); Johann Oswald, Eschenlohe (DE); Daniel Mahler, Hofstetten (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 223 days.

(21) Appl. No.: 18/247,913

(22) PCT Filed: Jul. 15, 2021

(86) PCT No.: PCT/DE2021/100621
§ 371 (c)(1),
(2) Date: Apr. 5, 2023

(87) PCT Pub. No.: WO2022/073533
PCT Pub. Date: Apr. 14, 2022

(65) Prior Publication Data
US 2023/0412024 A1  Dec. 21, 2023

(30) Foreign Application Priority Data

Oct. 7, 2020 (DE) ............... 10 2020 126 297.3
May 6, 2021 (DE) ............... 10 2021 111 836.0

(51) Int. Cl.
*H02K 1/2796* (2022.01)
*H02K 1/04* (2006.01)

(52) U.S. Cl.
CPC ............ *H02K 1/2796* (2022.01); *H02K 1/04* (2013.01)

(58) Field of Classification Search
CPC .. H02K 1/2796; H02K 1/2793; H02K 1/2795; H02K 21/24
(Continued)

(56) References Cited

U.S. PATENT DOCUMENTS 8,179,008 B2    5/2012  Asano
2010/0052452 A1*  3/2010  Yoshino ............... H02K 1/2795
                                                          310/156.01

FOREIGN PATENT DOCUMENTS

DE    102005009523    10/2005
DE    102007013732    10/2008
(Continued)

OTHER PUBLICATIONS

Machine Translation of EP_3376640_A1 (Year: 2018).*

*Primary Examiner* — Oluseye Iwarere
*Assistant Examiner* — Charlie Frank Mann, Jr.
(74) *Attorney, Agent, or Firm* — Volpe Koenig

(57) ABSTRACT

A rotor of an electric rotating machine, more particularly an axial flux machine, and an electric rotating machine equipped therewith. The rotor of the electric rotating machine, more particularly an axial flux machine, includes a plurality of magnets and a magnet carrier for fixing the magnets, with which carrier the magnets are positioned on a periphery with respect to a hub of the rotor. The magnet carrier extends radially outwards further than the magnets and has a first axial width at the periphery of the positioning of the magnets and forms a widened portion radially outside the magnets which has a second axial width which is greater than the first axial width. Using the rotor proposed here and the electric rotating machine equipped therewith, devices can be provided which, in a simple and cost-effective manner, guarantee efficient and low-wear operation.

17 Claims, 3 Drawing Sheets

(58) Field of Classification Search
USPC .......................................................... 310/156
See application file for complete search history.

(56) References Cited

FOREIGN PATENT DOCUMENTS

| | | | | |
|---|---|---|---|---|
| DE | 102014111234 | 2/2015 | | |
| EP | 1717935 | 11/2006 | | |
| EP | 3376640 | 9/2018 | | |
| EP | 3376640 A1 * | 9/2018 | ............... | F01D 1/00 |
| WO | 2020065488 | 4/2020 | | |

* cited by examiner

ROTOR OF AN ELECTRIC ROTATING MACHINE, AND ELECTRIC ROTATING MACHINE

CROSS-REFERENCE TO RELATED APPLICATIONS

This application is the U.S. National Phase of PCT Appln. No. PCT/DE2021/100621, filed Jul. 15, 2021, which claims the benefit of German Patent Appln. No. 102020126297.3, filed Oct. 7, 2020 and German Patent Appln. No. 102021111836.0, filed May 6, 2021, the entire disclosures of which are incorporated by reference herein.

TECHNICAL FIELD

The disclosure relates to a rotor of an electric rotating machine, in particular an axial flux machine, and an electric rotating machine equipped therewith, in particular an axial flux machine.

BACKGROUND

The electric drive train is known from the prior art. This consists of components for energy storage, energy conversion, and energy transmission. The energy conversion components include electric machines, for example axial flow machines. Various designs with one or more stators and one or more rotors are known from the prior art.

An electric axial flux machine, also referred to as a transverse flux machine, is a motor or generator in which the magnetic flux between a rotor and a stator is realized parallel to the axis of rotation of the rotor. Other designations for electric axial flux machines are also brushless DC motors, permanently excited synchronous motors, or disc motors.

Such an axial flux machine can be designed in types that differ in the arrangement of the rotor and/or stator and can have different special features and advantages when used, for example, as a traction machine for a vehicle.

In conventional embodiments of an axial flux machine, the rotor, with the exception of a hub, is essentially designed as a flat disk, the width of which is determined by the width of the magnets installed.

For high power densities, it is desirable to keep the axial distance between the stator and the rotor small.

FIG. 1 shows an embodiment of a conventional axial flux machine. It comprises 2 stators 1 arranged axial on both sides of a rotor 10, each having a stator core 2 and windings 3 aligned axially thereon.

The rotor 10 is arranged on a shaft 5 for rotation of the rotor 10 about the axis of rotation 6. The stators 1 are also arranged to be coaxial with the axis of rotation 6. A gap 4 is formed axially between a respective stator 1 and the rotor 10. The rotor 10 comprises a plurality of magnets 12 held by a magnet carrier 13.

The electromagnetic coupling between the winding and the iron of other components of the electric machine results in changing forces on the magnets 12 of the rotor 10 during operation of the electric machine, which can possibly lead to deformation of the rotor 10 and/or to wear or fatigue behavior. The gap 4 between the stator 1 and the rotor 10 is to be designed so large that collisions between the rotor 10 and the stator 1 cannot occur despite deformations of the rotor 10. However, this lowers the power density with which the relevant axial flow machine can be operated.

WO 2020/065488 A1 discloses a rotor of an electromagnetic axial flux machine having a body, comprising an internal hub, which is concentric with the axis of rotation. The body further comprises radial struts that extend to an outer hoop that forms an outer circular rim of the rotor. In each space defined between two adjacent struts, a magnet structure comprises multiple magnets. The body is formed from a plurality of stacked layers of composite materials containing fibers bonded by a resin.

SUMMARY

Proceeding therefrom, the object of the present disclosure is to provide a rotor of an electric rotating machine, in particular an axial flow machine, and an electric rotating machine equipped therewith, which ensure efficient and low-wear operation in a simple, cost-effective design.

This object is achieved by the rotor of an electric rotating machine and by the electric rotating machine having one or more of the features disclosed herein. Advantageous embodiments of the rotor of an electric rotating machine are listed below and in the claims. An advantageous embodiment of the electric rotating machine is also specified below and in the claims.

The features of the claims can be combined in any technically useful manner, wherein the explanations from the following description as well as features from the figures can also be consulted for this purpose, which comprise supplementary embodiments according to the disclosure.

In connection with the present disclosure, the terms "axial", "radial", and circumferential direction always refer to the axis of rotation of the electric rotating machine.

The disclosure relates to a rotor of an electric rotating machine, in particular an axial flux machine, comprising a plurality of magnets and a magnet carrier for fixing the magnets, with which the magnets are positioned on a periphery with respect to a hub of the rotor. The magnet carrier extends radially outwards further than the magnets and has a first axial width at the periphery of the positioning of the magnets. Radially outside of the magnets, the rotor forms a widened portion having a second axial width that is greater than the first axial width.

The rotor according to the disclosure is thus designed in what is known as an "I arrangement", i.e., having as the magnet carrier a disk formed to be essentially flat.

The periphery on which the magnets are arranged is defined by a circular ring surface which is delimited radially on the inside and outside by an inner periphery and an outer periphery.

The first axial width can be defined by the distance between the axial boundary surfaces of the magnet carrier itself or the magnets arranged on this periphery.

Due to the generally circular shape of the rotor, the widened portion is also designed in the shape of a circular ring. The widened portion can also be referred to as a barrel ring.

The second axial width can be up to 1.5 times the first axial width, for example.

Due to the widened portion, the magnet carrier has an increased geometrical moment of inertia on the radial outside, as a result of which a deformation caused by gyroscopic forces can be counteracted. In other words, the magnet carrier is stiffened on the radial outside thereof by the widened portion, so that it does not undergo axial deformation to a lesser extent even with gyroscopic forces acting on the radial outside thereof. This makes it possible to keep the gap between the rotor and an adjacent stator very small, so that the region of a magnetic field acting between the stator and rotor can be used for the operation of the electric rotating machine in which the power density is highest. Accordingly, the widened portion contributes to increasing the efficiency of the electric rotating machine.

In addition, the widened portion results in a concentration of material on the radial outside of the rotor, which also leads to a reinforcement or stiffening of the rotor in the radial direction, so that centrifugal forces applied in particular by the magnets on the magnet carrier can also be absorbed by the widened portion and consequently overall the strength of the rotor against centrifugal forces is increased.

In particular, the widened portion can be designed to be axially symmetrical with respect to a central plane of the rotor running perpendicularly to an axis of rotation of the rotor.

The central plane is a plane that runs through the axial center of the rotor and possibly of the magnets. In the case of axial symmetry of the rotor and the magnet arrangement, an axis of symmetry which is aligned to be perpendicular to the axis of rotation runs in this central plane.

This creates a T-shape in the cross-section of the rotor in the region of widened portion, wherein the central web of the T-shape extends in the central plane.

It is provided in one embodiment that the magnet carrier is essentially made of an electrically non-conductive material.

In particular, it is provided that the magnet carrier is made entirely of an electrically non-conductive material. The magnet carrier can be made from a glass fiber reinforced plastic or from a carbon fiber reinforced plastic.

The magnet carrier can be wound from the fibers mentioned and reinforced with a corresponding matrix material, or the magnet carrier has been produced from mats made from the corresponding fiber material which have been reinforced with the matrix material after being shaped as desired.

The same materials and manufacturing processes can also be used to produce the widened portion. In a special embodiment of the magnet carrier, this comprises the widened portion as an integral component. In this case, the widened portion has been produced during the winding of the corresponding fibers together with the remaining components of the magnet carrier, or has been produced during the shaping of the mats from the corresponding fiber material together with the remaining components of the magnet carrier.

The same applies to the widened portion, which can be an integral component of the magnet carrier.

A further advantageous embodiment provides that the rotor has at least one cover element on at least one axial side that essentially covers the magnets axially.

Such a cover element can also be referred to as a cover layer. In particular, the rotor can have at least one cover element on both axial sides.

Such a cover element can have the shape of a circular ring, or there are several cover elements on the axial side, each of which is designed in the form of circular ring segments and which together form a circular ring.

For example, the cover element or several cover elements can cover all magnets of the rotor on one axial side.

So as not to generate any additional electromagnetic losses in or on the rotor, the cover element can be made of an electrically non-conductive material.

The cover element can be materially bonded to the magnets and/or the magnet carrier. In particular, the cover element can be bonded to the magnet carrier and/or to the magnets thereof by means of bonding. This creates an axially very stiff sandwich structure in the axial direction, which counteracts an axial deformation of the rotor.

In one embodiment of the rotor, it is provided that the cover element supports at least one magnet axially.

This means that axial forces acting from one or more magnets are at least partially absorbed by the cover element. In this embodiment, the cover element and the mechanical connection thereof to the magnet carrier must be designed with a correspondingly sufficient axial stability to withstand the axial load from at least one magnet.

The material of the magnet carrier can in particular be a carbon fiber reinforced plastic. The material of the cover element can in particular be a glass fiber reinforced plastic.

For higher demands, however, poly(p-phenylene-2,6-benzobisoxazole), so-called PBO, or aramid fibers can also be used.

The use of carbon fiber reinforced plastic is particularly advantageous for the T-shaped widened portion due to the high E-modulus.

Such a combination of workpieces enables the rotor to be produced cost-effectively with sufficient stability of the rotor with regard to gyroscopic forces, centrifugal forces and, if appropriate, axially acting forces.

According to a further aspect, the disclosure relates to an electric rotating machine, in particular an axial flux machine, which has a rotor according to the disclosure and at least one stator with windings or coils, which is arranged to be axial adjacent to the rotor. A first axial distance between an axial stator end face formed by the stator on the periphery of the winding arrangement and the central plane of the rotor is less than a second axial distance between an axial end face of the widened portion facing the respective stator and the central plane of the rotor.

In particular, the electric rotating machine can be designed in such a way that a gap formed axially between the stator and the magnets of the rotor is overlaid by the widened portion at least in regions radially and along the axial direction.

In one embodiment of the electric rotating machine, which has two axially opposite stators with a rotor arranged therebetween, it is provided that the widened portion extends axially on both sides at least in regions over the gaps located on both sides axially between the rotor and the axially adjacent stators.

BRIEF DESCRIPTION OF THE DRAWINGS

The disclosure described above is explained in detail below against the significant technical background with reference to the accompanying drawings, which show preferred embodiments. The disclosure is not limited in any way by the purely schematic drawings, wherein it should be noted that the embodiments shown in the drawings are not limited to the dimensions shown. In the figures.

DETAILED DESCRIPTION

Figure 1:
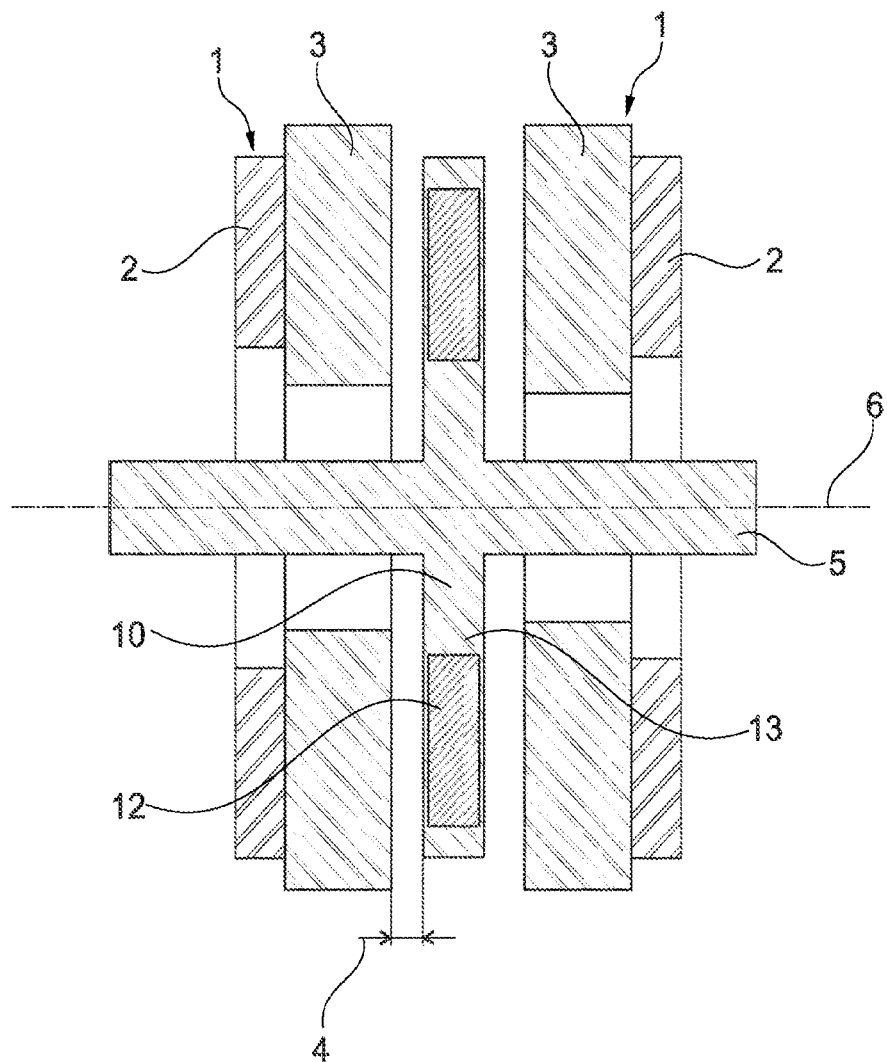
FIG. 1: depicts a conventionally designed axial flow machine in sectional view.

FIG. 1 has already been discussed in detail to explain the prior art.

Figure 2:
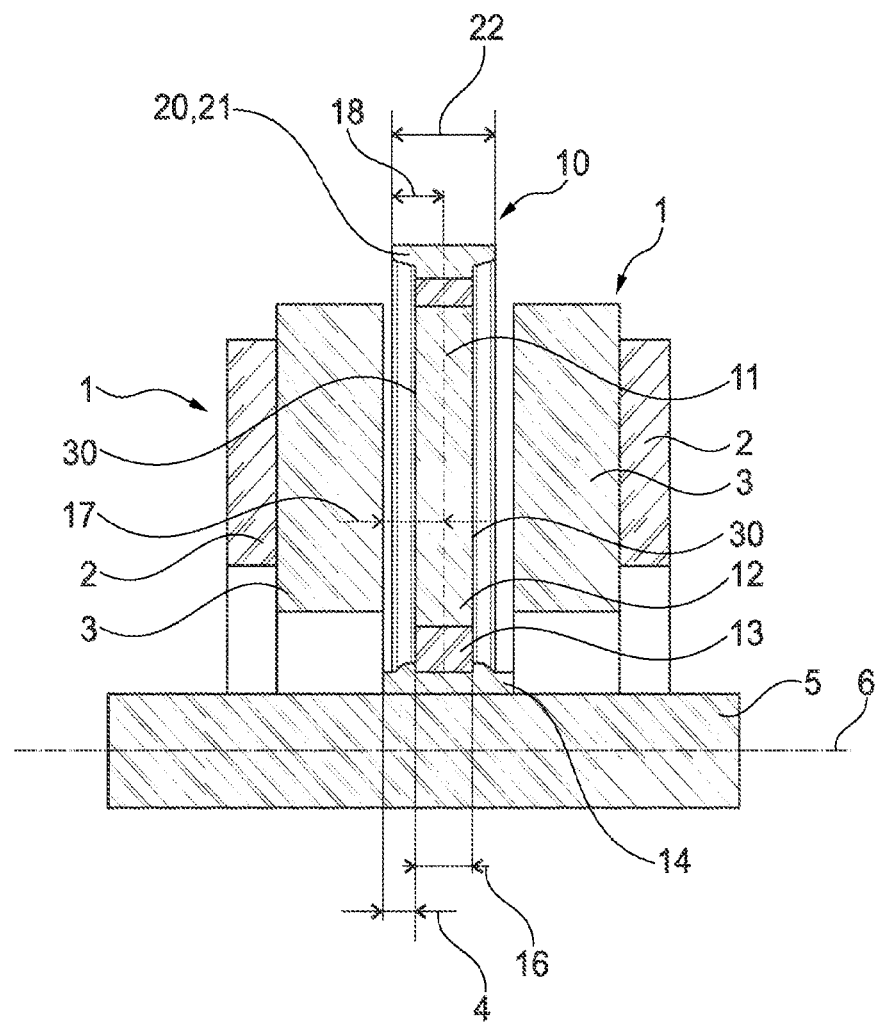
FIG. 2: depicts a partial section of an axial flow machine designed according to the disclosure.

FIG. 2 shows a partial section of an axial flow machine designed according to the disclosure. This comprises a rotor 10 aligned to be coaxial to an axis of rotation 6, and two stators 1 axially adjacent to this rotor 10. The stators 1 are formed with a respective stator core 2 and windings 3 or coils arranged axially thereon, which are aligned in the direction of the rotor 10.

There is an axial gap 4 between the windings 3 of the two stators 1 and the rotor 10.

The rotor 10 is seated with the hub 14 thereof on a shaft 5. Fixedly connected to the hub 14 is a magnet carrier 13 of the rotor 10, in which a plurality of magnets 12 are arranged to be distributed over a periphery in the embodiment shown here. In this region, the rotor has a first axial width 16 which is essentially defined by the axial width of the magnets 12.

The magnet carrier 13 extends radially further outwards than the magnets 12. On the radially outer side of the rotor 10, this forms a widened portion 20, which can also be referred to as a barrel ring or brace. In the embodiment shown here, the widened portion 20 has a T-shape 21 in the section shown, wherein the central web of the T-shape 21 lies in a central plane 11 of the rotor 10 in which an axial axis of symmetry of the section shown here also runs.

A first axial distance 17 between an axial stator end face formed by the stator 1 on the periphery of the winding arrangement and the central plane 11 of the rotor 10 is smaller than a second axial distance 18 between an axial end face of the widened portion 20 facing the respective stator 1 and the central plane 11 of the rotor 10.

The arrangement of the widened portion 20 on the radial outside of the rotor means that the rotor 10 has a second axial width 22 in this region, which is significantly larger than the first axial width 16. The widened portion 20 imparts to the rotor 10 in the radial outside region a higher rigidity in the axial direction. In addition, as a result of the widened portion 20 in this region, more material is available to absorb centrifugal forces that occur.

Figure 3:
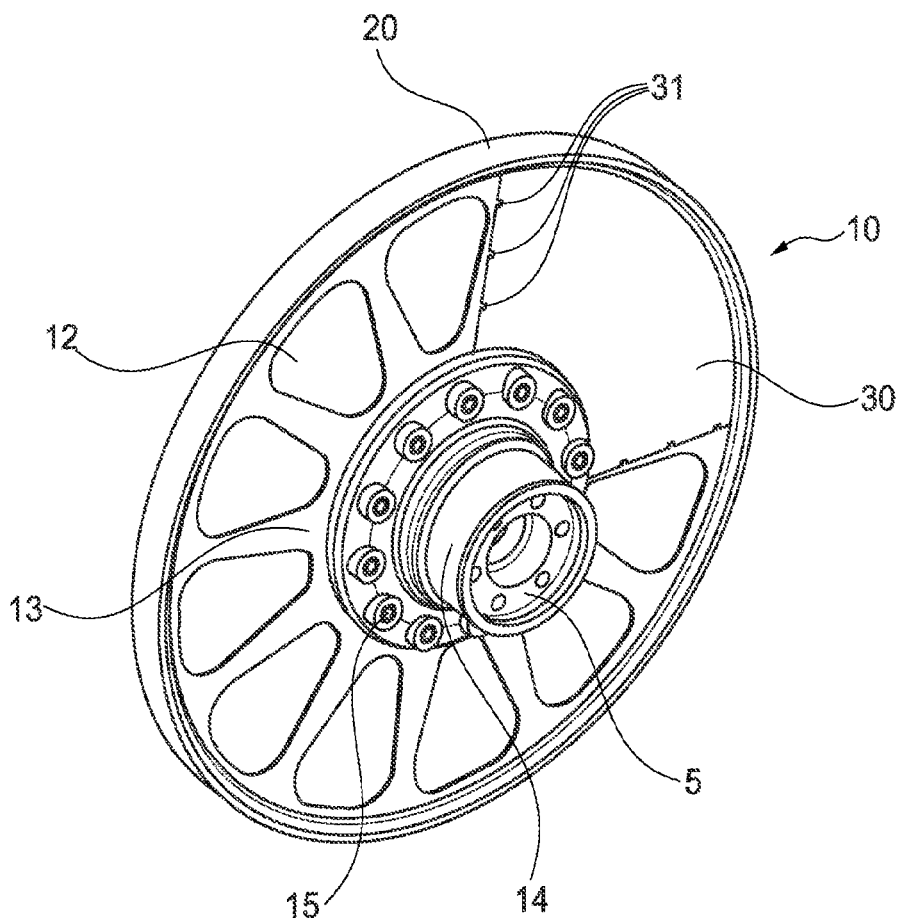
FIG. 3: depicts the rotor of the axial flow machine designed according to the disclosure in a perspective view.

As can be seen in particular from FIG. 3, the rotor 10 has at least one cover element 30 on each of the axial sides thereof, which both covers the magnets 12 and is also able to at least partially absorb the forces applied axially by the magnets 12. In this way, the cover elements 30 support the magnets 12 in the axial direction.

The cover elements 30 are in particular bonded materially to the magnets 12 and/or to the widened portion 20 in the radially outer region of the rotor 10, for example by gluing. This creates an axially rigid sandwich structure from the cover elements 30 and the magnets 12. FIG. 3 shows an example of several points on the segment of a cover element 30 shown here, on which bondings 31 can be made.

Due to the fact that both the magnet carrier 13 and a respective pressure element 30 can be made of a fiber-reinforced plastic component, such as a glass fiber-reinforced plastic or a carbon fiber-reinforced plastic, and the hub 14 can be made in particular as a metallic component, envisaged in the embodiment of the rotor 10 shown here, to realize, by means of screw connections 15, a fixed mechanical connection between the hub 14 and the magnet carrier 13 and/or the cover elements 30.

With the rotor proposed here and the electric rotating machine equipped therewith, devices are made available that ensure efficient and low-wear operation in a simple and cost-effective manner.

LIST OF REFERENCE SYMBOLS

1 Stator
2 Stator core
3 Winding
4 Gap
5 Shaft
6 Rotational axis
10 Rotor
11 Central plane
12 Magnet
13 Magnet carrier
14 Hub
15 Screw connection
16 First axial width
17 First axial distance
18 Second axial distance
20 Widened portion
21 T shape
22 Second axial width
30 Cover element
31 Bonding

The invention claimed is:

1. An electric rotating machine, comprising:
a rotor having a hub, a magnet carrier, a plurality of magnets fixed in the magnet carrier, the magnets are positioned on a periphery with respect to the hub, and the magnet carrier extends radially outwards further than the magnets and has a first axial width at a periphery of a position of the magnets and forms a widened portion radially outside the magnets which has a second axial width which is greater than the first axial width; and
at least one stator with windings arranged to be axially adjacent to the rotor;
wherein a first axial distance between an axial stator end face formed by the stator on a periphery of the winding arrangement and a central plane of the rotor is less than a second axial distance between an axial end face of the widened portion facing the respective stator and the central plane of the rotor.

2. The electric rotating machine according to claim 1, wherein the widened portion is axially symmetrical with respect to a central plane of the rotor that extends perpendicular to an axis of rotation of the rotor.

3. The electric rotating machine according to claim claim 1, wherein the magnet carrier is made of an electrically non-conductive material.

4. The electric rotating machine according to claim claim 1, further comprising at least one cover element on at least one axial side that axially covers the magnets.

5. The electric rotating machine according to claim 4, wherein the cover element is made of an electrically non-conductive material.

6. The electric rotating machine according to claim 4, wherein the cover element is materially bonded to at least one of the magnets or the magnet carrier.

7. The electric rotating machine according to claim 4, wherein the cover element axially supports at least one of the magnets.

8. The electric rotating machine according to claim 4, wherein the magnet carrier is a carbon fiber-reinforced plastic and the cover element is a glass fiber-reinforced plastic.

9. The electric rotating machine according to claim 1, wherein a gap formed axially between the stator and the magnets of the rotor, is overlaid by the widened portion at least in regions radially and along an axial direction.

10. An electric rotating machine comprising:
a rotor having a magnet carrier, a plurality of magnets fixed to the magnet carrier, the magnets are positioned circumferentially about an axis of rotation of the rotor, and the magnet carrier extends radially outwards further than the magnets and has a first axial width at a position of the magnets and has a widened portion radially outside the magnets which has a second axial width which is greater than the first axial width; and at least one stator with windings arranged to be axially adjacent to the rotor;

wherein a first axial distance between an axial stator end face formed by the stator on a periphery of the winding arrangement and a central plane of the rotor is less than a second axial distance between an axial end face of the widened portion facing the respective stator and the central plane of the rotor.

11. The electric rotating machine according to claim 10, wherein the widened portion is axially symmetrical with respect to a central plane of the rotor that extends perpendicular to the axis of rotation.

12. The electric rotating machine according to claim 10, wherein the magnet carrier is made of an electrically non-conductive material.

13. The electric rotating machine according to claim 10, further comprising at least one cover element on at least one axial side that axially covers the magnets.

14. The electric rotating machine according to claim 13, wherein the cover element is made of an electrically non-conductive material.

15. The electric rotating machine according to claim 13, wherein the cover element is materially bonded to at least one of the magnets or the magnet carrier.

16. The electric rotating machine according to claim 13, wherein the cover element axially supports at least one of the magnets.

17. The electric rotating machine according to claim 13, wherein the magnet carrier is a carbon fiber-reinforced plastic and the cover element is a glass fiber-reinforced plastic.

* * * * *